(12) United States Patent
Zhu et al.

(10) Patent No.: US 10,742,104 B2
(45) Date of Patent: Aug. 11, 2020

(54) LINEAR VIBRATING MOTOR WITH TRANSVERSE CROSS STRUCTURE

(71) Applicant: GOERTEK INC., Weifang, Shandong (CN)

(72) Inventors: Yueguang Zhu, Weifang (CN); Baoyu Liu, Weifeng (CN); Yuncheng Li, Weifeng (CN)

(73) Assignee: GOERTEK INC., Weifang, Shandong (CN)

( * ) Notice: Subject to any disclaimer, the term of this patent is extended or adjusted under 35 U.S.C. 154(b) by 84 days.

(21) Appl. No.: 16/083,171

(22) PCT Filed: Jun. 3, 2016

(86) PCT No.: PCT/CN2016/084795
§ 371 (c)(1),
(2) Date: Sep. 7, 2018

(87) PCT Pub. No.: WO2017/152524
PCT Pub. Date: Sep. 14, 2017

(65) Prior Publication Data
US 2019/0036435 A1    Jan. 31, 2019

(30) Foreign Application Priority Data
Mar. 7, 2016 (CN) .......................... 2016 1 0127478

(51) Int. Cl.
*H02K 33/06* (2006.01)
*H02K 33/02* (2006.01)
*H02K 33/18* (2006.01)
(52) U.S. Cl.
CPC ............. *H02K 33/06* (2013.01); *H02K 33/02* (2013.01); *H02K 33/18* (2013.01)

(58) Field of Classification Search
CPC ........ H02K 33/06; H02K 33/07; H02K 33/18; H02K 35/02
(Continued)

(56) References Cited

U.S. PATENT DOCUMENTS

2012/0169151 A1* 7/2012 Dong ..................... H02K 33/16
                                                                         310/25
2016/0013710 A1* 1/2016 Dong ..................... H02K 33/16
                                                                         310/25
(Continued)

FOREIGN PATENT DOCUMENTS

CN           2588583 Y    11/2003
CN         201160146 Y    12/2008
(Continued)

*Primary Examiner* — Michael Andrews
(74) *Attorney, Agent, or Firm* — Saliwanchik, Lloyd & Eisenschenk

(57) ABSTRACT

The present application discloses a linear vibrating motor and relates to the technical field of micro-motors. The linear vibrating motor comprises a housing, a stator and a vibrator, and further comprises elastic support members, which are located at two ends of the vibrator and configured to support the vibrator and to provide elastic restoring forces, wherein the elastic support member comprises two elastic arms; connecting portions are disposed at two ends of the same side of each elastic arm respectively; the connecting portions at one ends of the two elastic arms are combined together; the two elastic arms extend toward the respective connecting portions respectively in a transverse direction to form a transverse cross structure; and the two connecting portions at the other ends of the two elastic arms are in combination with the vibrator and the housing respectively.

10 Claims, 4 Drawing Sheets

(58) Field of Classification Search
USPC .................................................... 310/15–39
See application file for complete search history.

(56) References Cited

U.S. PATENT DOCUMENTS

2018/0278137 A1\* 9/2018 Zhu ........................ H02K 33/16
2018/0358879 A1\* 12/2018 Liu ......................... H02K 33/18

FOREIGN PATENT DOCUMENTS

| CN | 101964579 A | 2/2011 |
| CN | 102244454 A | 11/2011 |
| CN | 102332804 A | 1/2012 |
| CN | 105553219 A | 5/2016 |
| CN | 205595990 U | 9/2016 |
| JP | 2002200460 A | 7/2002 |
| WO | 2011065856 A1 | 6/2011 |

\* cited by examiner

LINEAR VIBRATING MOTOR WITH TRANSVERSE CROSS STRUCTURE

CROSS REFERENCE TO RELATED APPLICATIONS

This application is a National Stage of International Application No. PCT/CN2016/084795, filed on Jun. 3, 2016, which claims priority to Chinese Patent Application No. 201610127478.X, filed on Mar. 7, 2016, both of which are hereby incorporated by reference in their entireties.

FIELD OF THE INVENTION

The present application relates to the technical field of micro-motors, and in particular to a linear vibrating motor.

BACKGROUND OF THE INVENTION

A linear vibrating motor has a horizontal vibration direction and is mostly used in portable electronic products, such as a mobile phone, a hand-held game machine and a hand-held multimedia entertainment device. The linear vibrating motor usually comprises a housing, a stator and a vibrator. The stator comprises a coil secured to the housing. The vibrator comprises a permanent magnet that corresponds to the coil in a vertical direction and a mass block that is integrally secured to the permanent magnet. The linear vibrating motor further comprises elastic support members, which are disposed at two ends of the vibrator respectively and configured to support the vibrator and to provide elastic restoring forces in the horizontal direction.

Most conventional elastic support members are elastic sheets or springs, which are welded with housings of vibrating motors. Since there are many types of vibrating motors, in view of different shapes and properties of the vibrating motors, the shapes and the sizes of the elastic sheets or the springs are designed differently to guarantee the welding firmness and the vibration stability. FIG. 0.1 and FIG. 2 show an elastic support member in the prior art. The elastic support member is characterized in that two connecting portions 402b and 403b of each elastic arm 401b of the elastic support member 40b are located on two sides of the corresponding elastic arm 401b. The two connecting portions 403b at one ends of the two elastic arms 401b are connected together. Each elastic arm 401b extends toward the respective connecting portion 402b at the other end. This elastic support member has the significant defect that as a relatively bigger vibration space is taken up in the vibration direction of the vibrator, the size of the mass block in the vibrator is limited, and the mass block is relatively smaller and lighter. Consequently, the resonant frequency of the motor is increased. The low-frequency performance of the motor is reduced. Improvement of the overall performance of the motor is severely restricted.

SUMMARY OF THE INVENTION

In view of the above defect, the present application aims to solve a technical problem by providing a linear vibrating motor of which an elastic support member takes up a small vibration space. Thus, the size of a mass block is not limited. The low-frequency performance is better. The overall performance is high.

In order to solve the technical problem, the technical solution of the present invention is as below.

The linear vibrating motor comprises a housing, a stator and a vibrator, and is characterized by further comprising elastic support members, which are located at two ends of the vibrator and configured to support the vibrator and to provide elastic restoring forces. The elastic support member comprises two elastic arms. Connecting portions are disposed at two ends of the same side of each elastic arm respectively. The two connecting portions at one ends of the two elastic arms are combined together. The two elastic arms extend toward the respective connecting portions respectively in a transverse direction to form a transverse cross structure. The two connecting portions at the other ends of the two elastic arms are in one-to-one correspondence and combination with the vibrator and the housing respectively.

The elastic arm is made of a wire of a flat structure. The width of the wire in a vertical direction is more than that of the wire in a transverse direction.

An angle formed by the transverse cross structure is an acute angle. An intersection of the transverse cross structure is close to the combined ends of the two elastic arms.

The two elastic arms extend oppositely in the vertical direction to form a vertical cross structure. The two connecting portions being combined with the housing and the vibrator respectively have a vertical height difference.

The width of the portion between the two connecting portions of each elastic arm in the vertical direction is smaller than those of the two connecting portions in the vertical direction. The two connecting portions at the combined ends of the two elastic arms form a transverse cross make-way structure.

The elastic support member consists of the two elastic arms of the same structure.

The two connecting portions at the combined ends of the two elastic arms are combined into a whole through a welding process.

The two connecting portions being combined with the housing and the vibrator respectively are located at the same side of a central axis of the vibrator. The central axis is parallel to a vibration direction of the vibrator.

One elastic support member is disposed at each of the two ends of the vibrator. The state of one of the two elastic support members is the state in which the other one thereof is turned by 180° around the central axis.

Two elastic support members are disposed at each of the two ends of the vibrator. The state of one of the two elastic support members located at the same end of the vibrator is the state in which the other one thereof is turned by 180° around the central axis.

After adoption of the technical solution, the present application has the beneficial effects as follows.

In the linear vibrating motor provided by the present application, the elastic support member comprises two elastic arms, connecting portions are disposed at two ends of the same side of each elastic arm respectively, the two connecting portions at one ends of the two elastic arms are combined together, the two elastic arms extend toward the respective connecting portions respectively in the transverse direction to form the transverse cross structure, and the two connecting portions at the other ends of the two elastic arms are in one-to-one correspondence and combination with the vibrator and the housing respectively. Comparing the elastic support member provided by the present application with an elastic support member in the prior art (as shown in FIG. 1 and FIG. 2), it can be seen that if the two elastic support members consist of elastic arms with different connecting positions but the same overall structure and have the same overall vibration space in the vibration direction of vibrators, the single elastic arm of the elastic support member provided by the present application has a deformation space with a thickness of an elastic arm (the width of the elastic arm in the transverse direction) in the vibration direction relative to the single elastic arm of the elastic support arm in the prior art, and the elastic support member provided by the present application may generate a bigger elastic restoring force. In other words, when the same elastic restoring force is provided, the elastic support member in the linear vibrating motor provided by the present application saves more vibration space in the vibration direction, and therefore, facilitates mass increase of the mass block. Thus, the resonant frequency of the vibrating motor may be effectively reduced. The low-frequency performance of the vibrating motor is improved. The overall performance of the vibrating motor is higher.

As the width of the elastic arm in the vertical direction is more than that of the elastic arm in the transverse direction, the vibrator may be supported better in the vertical direction, and the weight of the vibrator is better borne. The vibration stability and balance of the vibrator may be effectively improved. The vibrator is prevented from polarization and noise generation during vibration.

As the two elastic arms are crossed in the transverse direction and the intersection is close to the connected ends of the two elastic arms, the elasticity coefficient of the elastic support member may be increased to the utmost extent and the vibration sense of the vibrating motor is improved. Meanwhile, the two elastic arms may be effectively prevented from cracking at their joints under the action of a tensile force in a long-term vibrating process. The service life of the vibrating motor is prolonged while its vibration performance is improved.

As the two connecting portions combined with the housing and vibrator respectively have the vertical height difference, the two connecting portions may not overlap when the elastic support member is compressed to the utmost degree. Thus, the deformation space of the single elastic arm of the elastic support member is further increased. The elasticity of the elastic support member is further improved.

As two elastic support members are disposed at each of two the ends of the vibrator, and the state of one of the two elastic support members located at the same end of the vibrator is the state in which the other one thereof is turned by 180° around the central axis, the two elastic support members located at the same end of the vibrator are oppositely disposed. Owing to this design of the two elastic support members, stress concentration may be reduced to the utmost extent. Thus, the elastic support members may be effectively prevented from elastic plastic deformation and fatigue fracture. The stability of the vibrating motor is improved. The service life of the vibrating motor is prolonged. Meanwhile, the vibrator is further prevented from polarization. The vibration stability and balance of the vibrator are improved. Noise is reduced.

To sum up, the following technical problems are solved by the linear vibrating motor provided by the present application: because the elastic support member of the linear vibrating motor in the prior art takes up the vibration space of the vibrator, the size of the mass block is limited, the service life of the elastic support member is short and the vibrator has high probability of polarization. As the elastic support member of the linear vibrating motor provided by the present invention takes up less vibration space of the vibrator, enough space is reserved for increasing the size of the mass block in the vibrator, substantially reducing the probability of polarization, and improving the low-frequency performance and the overall performance of the linear vibrating motor. Meanwhile, the vibration stability and reliability of the linear vibrating motor are high, and the service life thereof is long.

Figure 1:
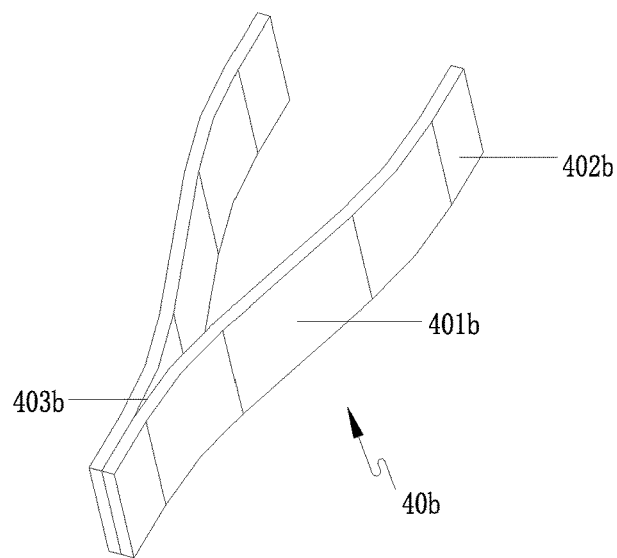
FIG. 1 is a schematic structural view of an elastic support member in the prior art.

In the drawings, the reference numerals represent the following members respectively: 10—upper housing; 12—lower housing; 20—vibrator; 22—washer; 24—mass block; 26—permanent magnet; 30—coil; 40a, 40b—elastic support member; 401a, 401b, 401c—elastic arm; 402a, 402b, 402c, 403a, 403b, 403c—connecting portion; 404—transverse cross make-way portion; 405: transverse cross included angle; 50: FPCB.

DETAILED DESCRIPTION OF THE EMBODIMENTS

The present application will be further described below with reference to the accompanying drawings and embodiments.

Orientations involved in the description mean orientations in which a motor works normally. In the description, the involved term "inner side" means the side close to the center of a linear vibrating motor. The involved term "outer side" means the side away from the center of the linear vibrating motor. The involved term "transverse direction" means a horizontal direction. The involved term "vertical direction" means a lengthwise direction perpendicular to a horizontal plane.

Embodiment I

Figure 5:
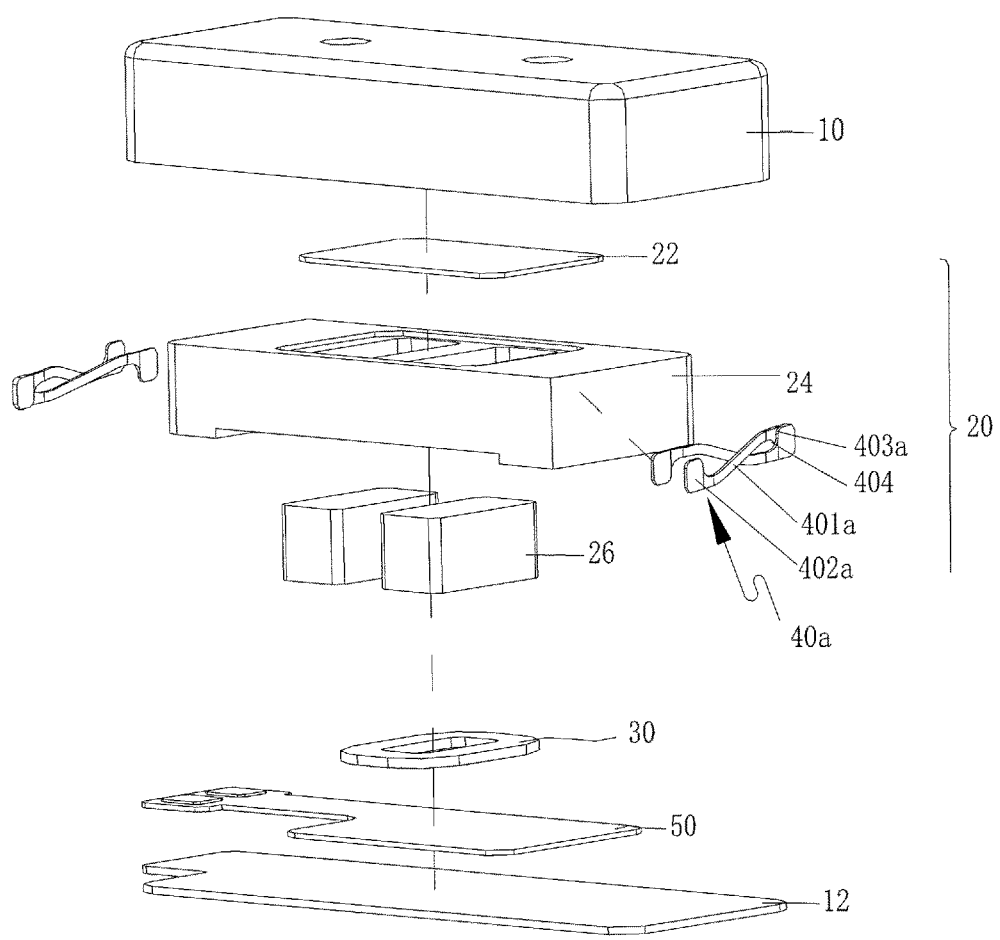
FIG. 5 is a breakdown structure schematic view of an embodiment I of a linear vibrating motor provided by the present application.
Figure 6:
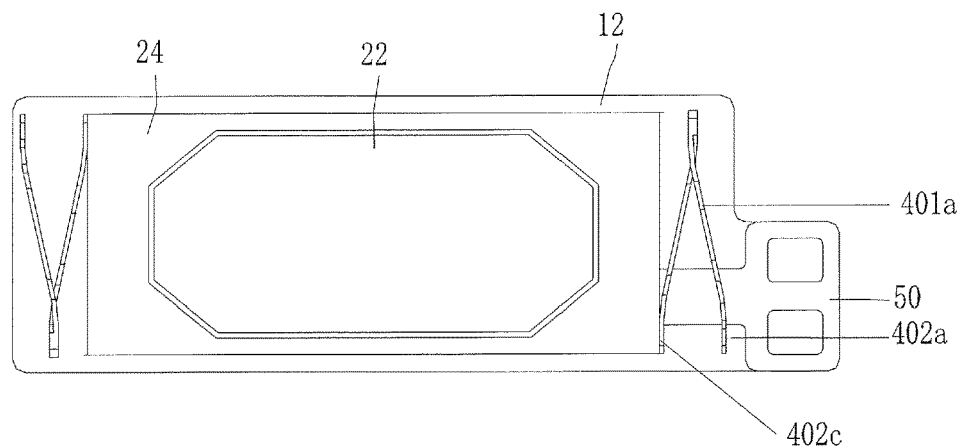
FIG. 6 is a partial diagram of FIG. 5 without an upper housing.

As shown in FIG. 5 and FIG. 6, a linear vibrating motor is of a cuboid structure and comprises a housing, a stator, a vibrator 20 and elastic support members 40a. The elastic support members 40a are located at two ends of the vibrator and configured to support the vibrator and to provide elastic restoring forces. The housing comprises an upper housing 10 and a lower housing 12 that are combined together. The upper housing 10 is of a box-shaped structure with one end opened. The lower housing 12 is of a platy structure. The open end of the upper housing 10 is fastened with the lower housing 12. The stator is secured to the lower housing 12. The vibrator 20 is suspended in a space, surrounded by the upper housing 10 and the lower housing 12, by means of the elastic support members 40a.

As shown in FIG. 5 and FIG. 6, the vibrator 20 comprises a mass block 24. Two mounting cavities are disposed in the central position of the mass block 24 side by side. A permanent magnet 26 is secured in each mounting cavity. A washer 22 is further secured to the side, close to the upper housing 10, of the mass block 24 and covers the two permanent magnets 26. The stator comprises a coil 30. The coil 30 is of a flat structure and is horizontally secured to an FPCB 50 that is secured to the inner side of the lower housing 12. The elastic support members 40a are secured to two ends of the mass block 24 respectively and hang the whole vibrator in the space surrounded by the upper housing 10 and the lower housing 12. When the motor works, alternating current passes through the coil 30 to generate an alternating current magnetic field. Under interaction of the permanent magnets 26 and the magnetic field generated by the coil 30, the vibrator performs reciprocating vibration in the horizontal direction to produce a vibration sense. A vibration direction of the vibrator is consistent with the long axis direction of the vibrating motor.

As shown in FIG. 5 and FIG. 6, in this implementation, one elastic support member 40a is disposed at each of the two ends of the vibrator. The state of one of the two elastic support members 40a is the state in which the other one thereof is turned by 180° around a central axis that is parallel to the vibration direction of the vibrator 20.

As shown in FIGS. 3 to 6, each elastic support member 40a comprises two elastic arms 401a and 401c. Connecting portions are disposed at two ends of the same side of each elastic arm respectively. That is, connecting portions 402a and 403a are located at two ends of the same side of the elastic arm 401a respectively. Connecting portions 402c and 403c are located at two ends of the same side of the elastic arm 401c. These connecting portions may be connecting points, connecting faces, connecting holes, external portions that are externally connected to two ends of the elastic arms but play the same roles as the connecting portions in the present patent application, or the like, which will not be limited by the present patent application. The two connecting portions at one ends of the elastic arms 401a and 401c are combined together. The two connecting portions at which ends of the two elastic arms are connected together will not be limited by the present patent application. In this embodiment, the connecting portions 403a and 403c are combined together while the connecting portions 402a and 402c are in a free state, and vice versa. In the implementation, the connecting portions 403a and 403c are preferably combined together by means of welding, and certainly, may be combined together in other modes, for example, riveting, or are integrally formed, which will not be limited by the present patent application. In the embodiment, the elastic support member preferably consists of the two elastic arms with completely the same structure, and certainly, may also consist of the two elastic arms with not exactly the same structures, which will not be limited by the present patent application.

Figure 4:
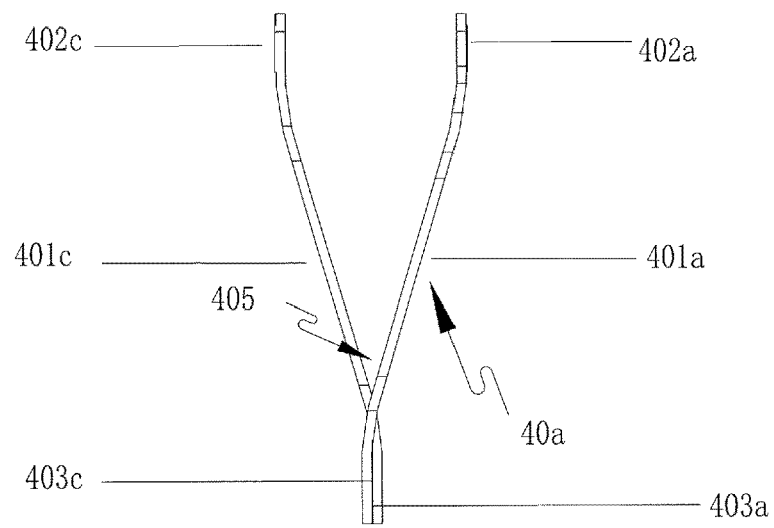
FIG. 4 is a structural top view of an elastic support member of a linear vibrating motor provided by the present application.

The elastic arm 401a extends toward its connecting portion 402a or 403a in a transverse direction. The elastic aim 401c extends toward its connecting portion 402c or 403c in the transverse direction. The two elastic arms 401a and 401c extend oppositely to form a transverse cross structure. As shown in FIG. 4, the top view of the whole elastic support member 40a is of an approximately V-shaped structure.

The two connecting portions 402a and 402c at the other ends of the two elastic arms 401a and 401c are in one-to-one correspondence and combination with the vibrator 20 and the housing respectively. The connecting portions 402a and 402c are located at the same side of the central axis of the vibrator 20. In this embodiment, the connecting portion 402c is connected to a side wall of the vibrator 20, the connecting portion 402a is connected to an inside wall of the housing, and vice versa, which will not be limited by the present patent application.

Figure 2:
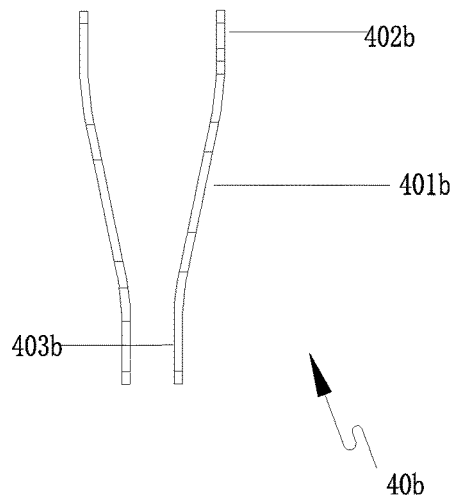
FIG. 2 is a structurally enlarged top view of an elastic support member in the prior art.

Compared with an elastic support member in the prior art as shown in FIG. 1 and FIG. 2, the single elastic arm of the elastic support member provided by the present application has a deformation space with the thickness of an elastic arm (the width of the elastic arm in the transverse direction) in the vibration direction relative to the single elastic arm of the elastic support arm in the prior art. Known from the Hooke's law, the elastic support member provided by the present application may generate a bigger elastic restoring force. In other words, when the same elastic restoring force is provided, the elastic support member in the linear vibrating motor provided by the present application saves more vibration space in the vibration direction, and therefore, facilitates mass increase of the mass block of the vibrator. Thus, the resonant frequency of the vibrating motor may be effectively reduced. The low-frequency performance of the vibrating motor is improved. The overall performance of the vibrating motor is higher.

Figure 3:
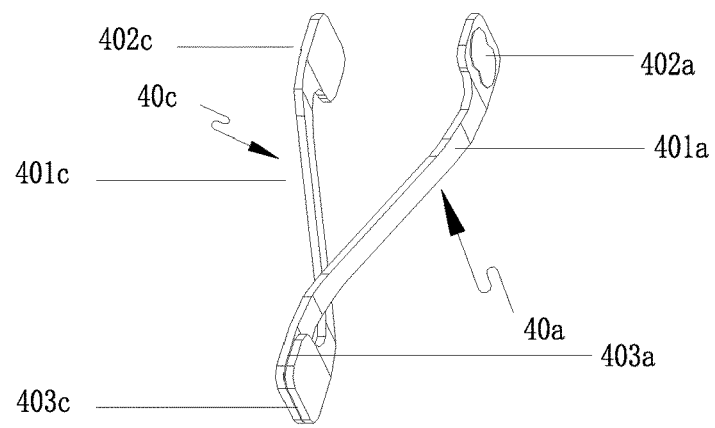
FIG. 3 is a schematic structural view of an elastic support member of a linear vibrating motor provided by the present application.

Preferably, as shown in FIG. 3, the elastic arms 401a and 401c of the elastic support member 40a are made of wires of flat structures. The wires are disposed in a vertical direction. That is, the widths of the elastic arms made of the wires in the vertical direction are more than those of the elastic arms in the transverse direction. The connecting portions 402a, 403a, 402c and 403c are respectively disposed at one side of the widths of the elastic arms 401a and 401c in the vertical direction. This structure may improve the strength of the elastic support member 40a in the vertical direction, may better bear the weight of the vibrator, and improves the vibration stability and balance of the vibrator. The vibrator is prevented from polarization and noise generation during vibration.

Preferably, as shown in FIG. 3 and FIG. 4, an included angle 405 formed by crossing of the two elastic arms 401a and 401c in the transverse direction is an acute angle. An intersection of a transverse cross structure is close to the combined ends of the two elastic arms 401a and 401c. This structure may increase the elasticity coefficient of the elastic support member to the utmost extent and improve the vibration sense of the vibrating motor. Meanwhile, the two elastic arms may be effectively prevented from cracking at their joints under the action of a tensile force in a long-term vibrating process. The service life of the vibrating motor is prolonged while its vibration performance is improved.

As shown in FIG. 5, in order to prevent the portions, close to the combination portions, of the two elastic arms 401a and 401c rub or collide each other during stretching. The width of the portion between the two connecting portions of each elastic arm in the vertical direction is smaller than those of the two connecting portions in the vertical direction. That is, the width of the portion between the two connecting portions 402a and 403a of the elastic arm 401a in the vertical direction is smaller than, and in this embodiment is half of, those of the connecting portions 402a and 403a in the vertical direction, so does the elastic arm 401c. The two connecting portions 402a and 402c at the combined ends of the two elastic arms 401a and 401c form a transverse cross make-way structure 404.

Preferably, the two elastic arms 401a and 401c of the elastic support member 40a extend in opposite directions in the vertical direction to form a vertical cross structure. The two connecting portions 402a and 402c that are combined with the housing and the vibrator 20 respectively have a vertical height difference. From a side view, the whole elastic support member 40a is approximately x-shaped (not shown). As the two connecting portions 402a and 402c have the vertical height difference, the above-mentioned two connecting portions may not overlap when the elastic support member is compressed to the utmost degree. Compared with the design in the prior art that two connecting portions in the same connecting position overlap when compressed, the present patent application has the advantages that the elastic support member has a deformation space with the thickness of the elastic arm, and the elasticity of the elastic support member is further increased.

Embodiment II

This embodiment is basically the same as the embodiment I. Differences are as below.

Figure 7:
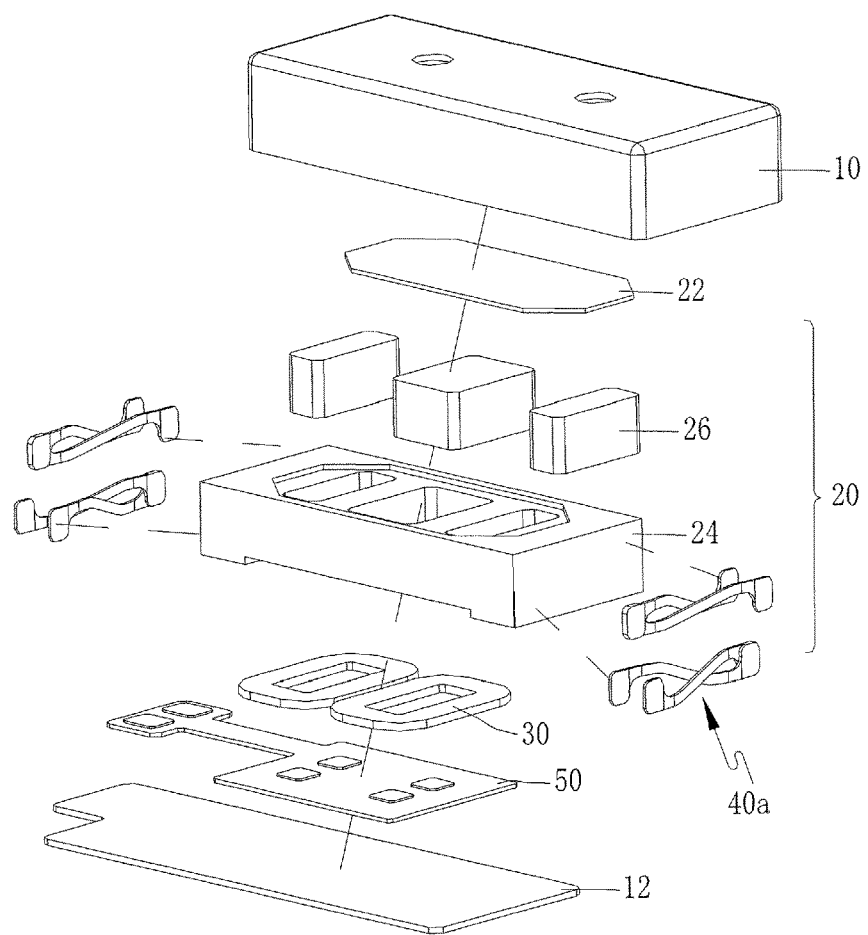
FIG. 7 is a breakdown structure schematic view of an embodiment II of a linear vibrating motor provided by the present application.
Figure 8:
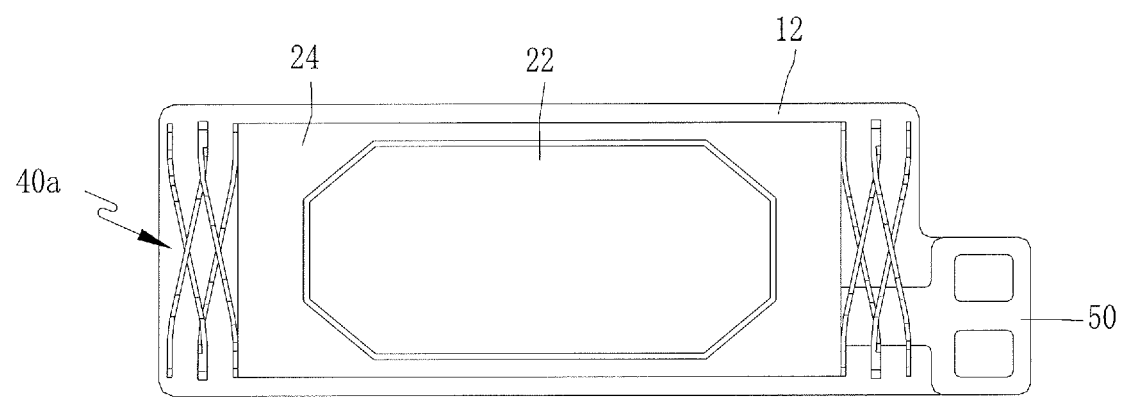
FIG. 8 is a partial diagram of FIG. 7 without an upper housing.
Figure 9:
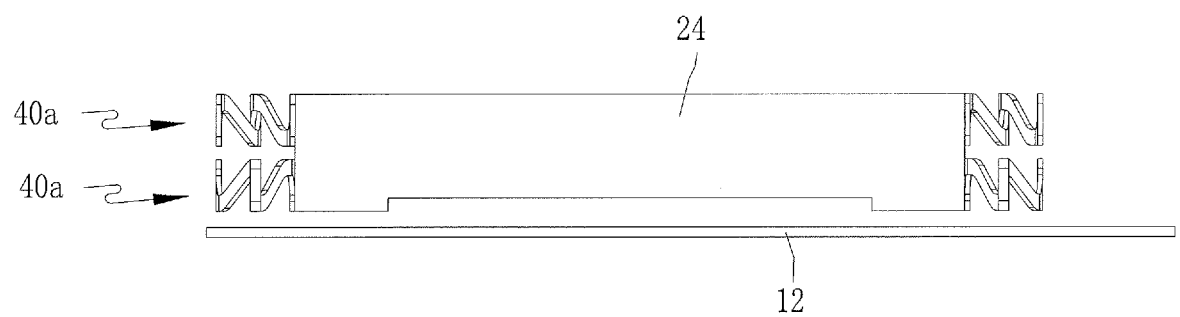
FIG. 9 is a lateral structure schematic view of an embodiment II of a linear vibrating motor provided by the present application.

As shown in FIG. 7, FIG. 8 and FIG. 9, two elastic support members 40a that adopt the same structure and are superimposed up and down are disposed at each of two ends of a vibrator. The state of one of the two elastic support members 40a at the same end of the vibrator is the state in which the other one thereof is turned by 180° around a central axis that is parallel to a vibration direction of the vibrator.

As shown in FIG. 7, in this implementation, three mounting cavities are disposed in the middle of a mass block 24 side by side. A permanent magnet 26 is secured in each mounting cavity. A stator in this implementation comprises two coils 30 that are disposed side by side. The two coils 30 are secured to the inner side of a lower housing 12 through an FPCB 50.

Compared with the embodiment I, this implementation has the advantages that the vibration stability of the vibrator is higher, polarization of the vibrator is reduced more effectively, and particularly, polarization in a horizontal direction and a height direction that are perpendicular to the vibration direction of the vibrator is reduced obviously. Meanwhile, deflection of the vibrator may be effectively reduced. Noise is small. The elasticity coefficient of the elastic support member may be increased to the utmost extent. The space is saved. The mass of the vibrator is increased. Accordingly, a vibration sense of the vibrating motor is further improved.

The above two embodiments merely illustrate the linear vibrating motor and the elastic support member of the present application by examples. In application, structures of linear vibrating motors are not limited to the structures described by the above embodiments. The technical solution of the present application may be applicable to the linear vibrating motors of any structures, including regularly-structured motors and irregularly-structured motors. Those skilled in the art may apply the technical solution of the present application to linear vibrating motors of other structures without any creative work according to the explanation of the description. Thus, any motor products whose elastic support members are substantially the same as those described in this patent shall fall into the scope of protection of the present application no matter if other structures of the linear vibrating motors are consistent with those in the embodiments or not.

The present application is not limited to the above-mentioned specific implementations. Various modifications made by those skilled in the art without any creative work from the above conception should fall within the scope of protection of the present application.

What is claimed is:

1. A linear vibrating motor with a transverse cross structure, comprising a housing, a stator and a vibrator, and further comprising elastic support members, which are located at two ends of the vibrator respectively and configured to support the vibrator and to provide elastic restoring forces, wherein each elastic support member comprises two elastic arms comprising a first elastic arm adjacent to an inner wall of the housing and a second elastic arm adjacent to the vibrator, each first elastic arm comprises a first connecting portion and a second connecting portion on a first side facing the housing, each second elastic arm comprises a third connecting portion and a fourth connecting portion on a second side facing the vibrator, each first connecting portion is located on a first end of the respective first elastic arm, each second connecting portion is located on a second end of the respective first elastic arm, each third connecting portion is located on a third end of the respective second elastic arm, and each fourth connecting portion is locate on a fourth end of the respective second elastic arm;

the first end of each first elastic arm and the third end of each second elastic arm in a free state are spaced apart, the first elastic arm and the second elastic arm of each elastic support member cross and are combined by the second connecting portion and the fourth connecting portion;

the first elastic arm and the second elastic arm of each elastic support member extend toward the first connecting portion and the third connecting portion respectively in a transverse direction to form the transverse cross structure;

the first connecting portion of the first end of the first elastic arm of each elastic support member is connected to the inner wall of the housing, and the third connecting portion of the third end of the second elastic arm of each elastic support member is connected to the a side wall of the vibrator; and there is a vertical height difference between the first connecting portion and the third connecting portion each elastic support member, and the first connecting portion and the third connecting portion do not overlap when the respective elastic support member is compressed to its utmost degree.

2. The linear vibrating motor according to claim 1, wherein the elastic arm is made of a wire of a flat structure, and the width of the wire in a vertical direction is greater than that in the transverse direction.

3. The linear vibrating motor according to claim 1, wherein an angle formed by the transverse cross structure is an acute angle, and an intersection of the transverse cross structure is adjacent to a combined end of the two elastic arms.

4. The linear vibrating motor according to claim 1, wherein the two elastic arms extend oppositely in a vertical direction to form a vertical cross structure.

5. The linear vibrating motor according to claim 1, wherein the width of the portion between the two connecting portions of each elastic arm in a vertical direction is smaller than those of the two connecting portions in the vertical direction; and the second connecting portion and the fourth connecting portion of each elastic support member form a transverse cross make-way structure.

6. The linear vibrating motor according to claim 1, wherein each elastic support member comprises the two elastic arms of the same structure.

7. The linear vibrating motor according to claim 1, wherein the second connecting portion and the fourth connecting portion of each elastic support member are combined into a whole by a welding process.

8. The linear vibrating motor according to claim 1, wherein the first connecting portion and the third connecting portion of each elastic support member are located at the same side of a central axis of the vibrator, and the central axis is parallel to a vibration direction of the vibrator.

9. The linear vibrating motor according to claim 8, wherein each of the two ends of the vibrator is provided with one elastic support member, and the state of one of the two elastic support members is the state when the other one thereof is turned by 180° around the central axis.

10. The linear vibrating motor according to claim 8, wherein each of the two ends of the vibrator is provided with two elastic support members, and the state of one of the two elastic support members located at the same end of the vibrator is the state when the other one thereof is turned by 180° around the central axis, the two elastic support members being overlapped in a vertical direction.

* * * * *